Nov. 7, 1933.  F. C. PERKINS  1,933,928
SECONDARY BATTERY
Filed Aug. 27, 1932
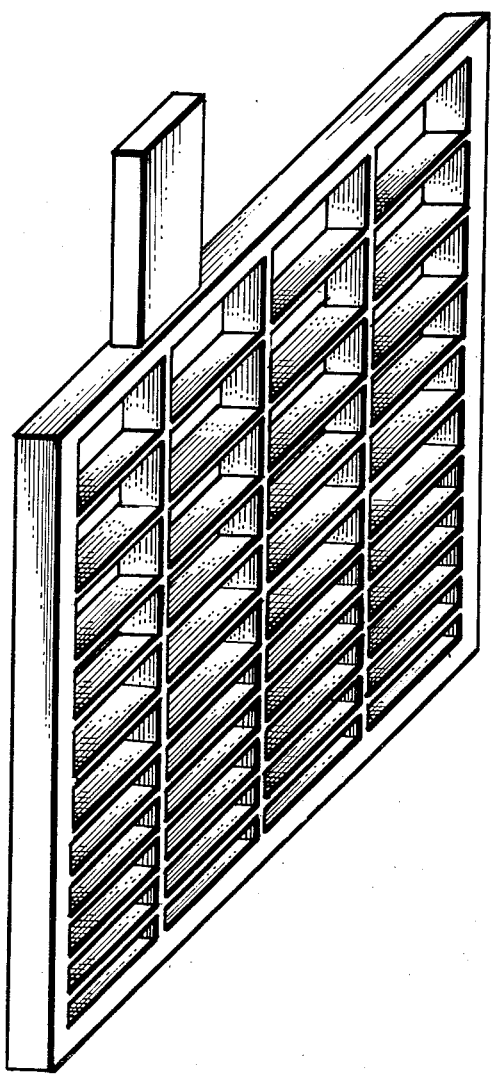
Inventor
Fred C. Perkins Patented Nov. 7, 1933

1,933,928

UNITED STATES PATENT OFFICE 1,933,928

SECONDARY BATTERY

Fred C. Perkins, York, Pa.

Application August 27, 1932. Serial No. 630,709

2 Claims. (Cl. 136—38)

This invention relates to secondary batteries of the lead-acid type and has particular relation to method of spacing horizontal or diagonal ribs in the gridwork of positive plates.

The primary object of the invention is to secure longer life for positive plates under conditions whereby the battery is usually destroyed or worn out by sulphation.

Referring to the drawing wherein I have illustrated an embodiment of my invention:—

The single figure is a perspective view of a positive plate consisting of vertical and horizontal ribs, in which the horizontal ribs are spaced closer to each other at bottom of plate than at the top.

Detailed description

An experience of 20 years in the handling of farm-lighting-plant batteries has proved to me conclusively that in almost all cases, where horizontal ribs of positive plates are spaced evenly from top to bottom, that the positive plates show a decided tendency to shed their material faster at the bottom than at the top. In extreme cases I have found the active material had entirely departed from the bottom portion of the plate, whereas at the very top portion but very little wear had yet made its appearance. While there is nearly always a noticeable difference in rate of wear between bottom and top portions of the plate, yet I have observed that where the cells have not been properly cycled, that a greater difference in rate of wear (of bottom as compared with top) is discerned. So noticeable is the difference in rate of wear between bottom and top of positive plates, particularly of the Faure type and in which horizontal ribs had been spaced evenly, that men in my employ have adopted the custom of speaking of positive plates as wearing "wedge shaped." The rate of wear progresses quite evenly at an increasing rate from top to bottom and thus gives to a used positive plate (such as found in actual field service in batteries of low discharge value) the appearance of a "wedge."

It has been my experience that with batteries of high discharge value and which are more likely to receive frequent "cycling" while in service, that no difference whatever is usually discernible in rate of wear (of bottom as compared with top), hence it is conclusive to me that the phenomenon of uneven wear that I have observed in batteries of low discharge value is not due to stratification of acid strength. I ascribe the effect as due to varying degrees of sulphation of active material which comes about through ordinary methods of care.

Always, the top and bottom horizontal ribs lie closer to the framework of the plate than they do to the next adjoining rib. I have often observed that where this lessened space exists at the bottom of the plate, that the active material between the bottom rib and framework lasts longer than between this rib and the adjacent rib. I have also observed that under similar conditions at top of the plate that no wear at all can be discerned in many cases where wear in lower portion of plate had progressed to a considerable extent—where material had entirely departed over a considerable portion of the bottom half of plate.

My invention consists primarily in spacing the horizontal ribs progressively (as regards space) from the bottom to the top—starting with a comparatively close spacing at the bottom and increasing it gradually until I reach the top. By so doing I counteract the tendency of the plate to wear "wedge shaped". By increasing the spacing at the top, I offer a tendency for active material (in more or less sulphated condition) to shed itself faster than at the bottom of plate where the ribs lie closer together.

I so regulate the spacing of the horizontal ribs that I cause the greater portion of the mass (of active material) to be located in the upper portion of the plate—where I have found a lesser rate of wear to occur.

Another viewpoint is that since we desire the surface of the plate to wear evenly and thus better maintain its capacity (capacity depending mostly on exposed surface), and by placing the ribs close together at the bottom of plate I retard the rate of shedding at that point. I provide a tendency for the upper portion to wear faster than the bottom, yet since the natural tendency of the plate (in its partially sulphated condition) is to wear faster at bottom than top, I thus establish a means of causing an even wear over the entire surface of the plate—for a given amount of active material to be used.

Referring to my drawing, I show an elementary type of gridwork with cross bars running entirely across the width and thickness of the plate. In actual practice I prefer to use a more standard type of horizontal rib which does not extend full across the thickness of the plate. I prefer also to use alternate horizontal ribs, as commonly used, to better hold active material in place. I do not limit my invention to any design whatever of horizontal or diagonal ribs but I do define my invention as having for its purpose an uneven distribution of material in such a manner as to give larger "pellets" of active material at top of the plate than at the bottom at same time using same amount of active material as if spacing had been same all way up. While I prefer to design my grid so as to give the active positive material a "wedge shape" formation as regards its mass, yet I desire to have it understood that I do not limit my invention entirely to this. For instance, the lower half could have one spacing and the upper half another spacing, and the construction would still be an improvement over the method of equal spacing now in vogue—just as long as the greater mass and the greater exposure lay in the upper half. Modifications and changes can be made without departing from the spirit of my invention and within the scope of the appended claims.

Having described my invention, what I desire to secure by Letters Patent, and what I claim, is:—

1. A positive plate having rectangular openings the widths of which are constant and the heights of which progressively increase from the bottom to the top of the plate, and active material in said openings.

2. A positive plate having a plurality of vertical rows of cells containing active material, the exposed area of the active material in the cells in each row progressively increasing from the bottom to the top of the plate.

FRED C. PERKINS.